June 23, 1959 V. C. HALL 2,892,016

VARIABLE BLACK PLATE FOR USE IN COLOR REPRODUCTION SYSTEMS

Filed Sept. 26, 1956 2 Sheets-Sheet 1

INVENTOR
VINCENT C. HALL
BY Campbell, Brumbaugh, Free and Graves
HIS ATTORNEYS

INVENTOR
VINCENT C. HALL
BY Campbell, Brumbaugh
Free and Graves
HIS ATTORNEYS

United States Patent Office 2,892,016

Patented June 23, 1959

2,892,016

VARIABLE BLACK PLATE FOR USE IN COLOR REPRODUCTION SYSTEMS

Vincent C. Hall, Stamford, Conn., assignor to Time, Incorporated, New York, N.Y., a corporation of New York Application September 26, 1956, Serial No. 612,228

10 Claims. (Cl. 178—5.2)

The present invention relates to the reproduction of subjects in color. More particularly, it has to do with new and improved methods and apparatus for preparing a so-called "black printer" for use in making four color reproductions from colored originals.

While it is theoretically possible to produce any color by combining inks of the three subtractive primary colors, yellow, magenta and cyan, in proper proportions, it is generally preferred, in printing color reproductions, to use the three primaries and black. Deficiencies in the three primary colored inks make this desirable. Also it is easier to produce a good black color with a true black ink than by combining proper amounts of the subtractive primaries, and black ink is considerably cheaper than colored inks.

Four color reproduction work requires the preparation from the colored original of four color separation negatives corresponding to the three subtractive primary colors and black, the latter negative usually being designated the "black printer." Attempts have been made, heretofore, to produce a "black printer" by electronic means. These efforts have not been particularly successful, however, primarily because they could not accurately produce a "black printer" in accordance with theoretical requirements. The principal object of the present invention, accordingly, is to provide new and improved methods and apparatus for producing electronically, from a colored original, a "black printer" that is substantially in conformity with theory.

Another object of the invention is to provide new and improved methods and apparatuses of the above character for simultaneously producing electronically, from a colored original, four color separation negatives, corresponding to three primary colors and black, that are color corrected essentially in accordance with theoretical considerations.

Figures 1A, 1B, 1C, 2:
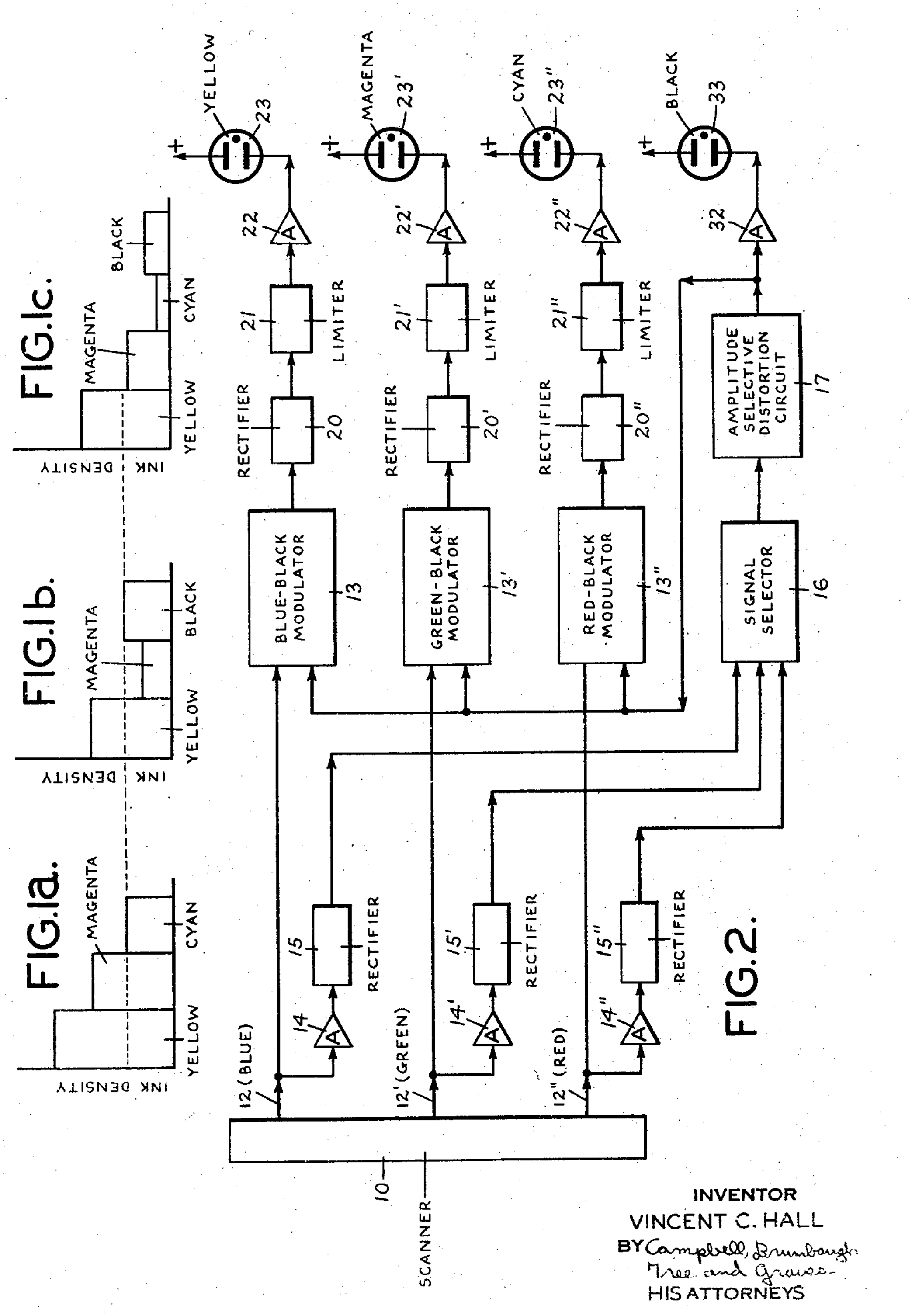
Figure 3A:
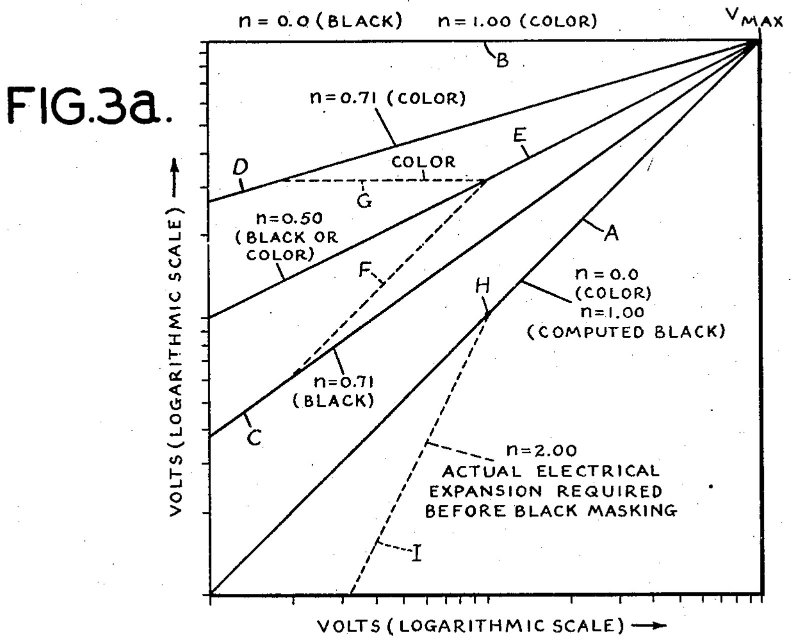
Figure 3B:
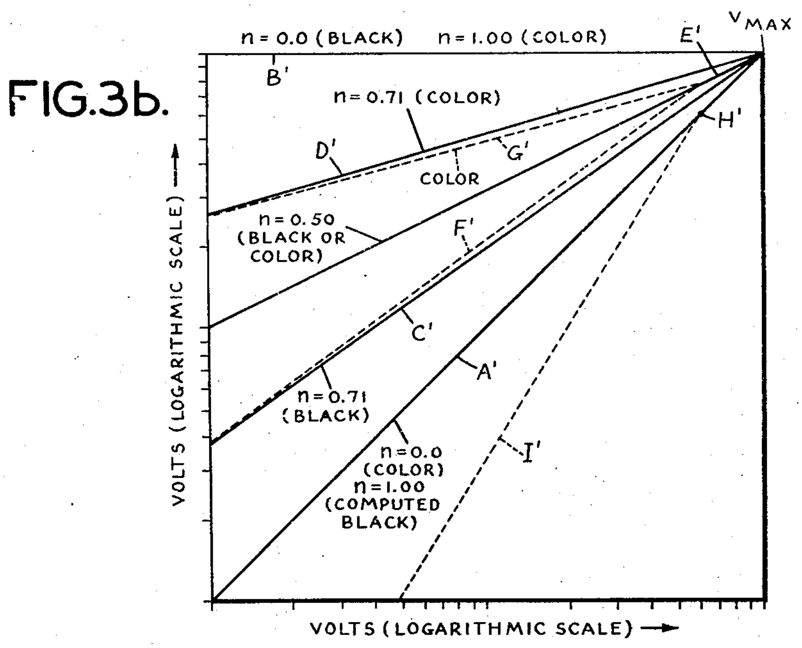

For a better understanding of the invention, reference is made to the following detailed description of a representative embodiment, taken in conjunction with the accompanying drawings, in which:

Figures 1*a*, 1*b* and 1*c* are graphs illustrating some of the principles on which the invention is based;

Figure 2 is a schematic diagram in block form of apparatus constructed according to the invention; and Figures 3*a* and 3*b* are graphs of aid in explaining the nature of the invention.

As stated, any color can be reproduced by combining proper amounts of inks of the subtractive primary colors. Thus, in Fig. 1*a*, a given color can be produced by combining yellow, magenta and cyan inks of densities indicated by the ordinates of the three columns shown in the figure. In such a color, the only function served by the color component of minimum density (cyan in Fig 1*a*) is to combine with equal amounts of the other two colored inks to form a gray in the final colored reproduction.

In a four color system, part or all of the grays and blacks in the original are printed by black ink instead of by equal amounts of inks of the three subtractive primary colors. Thus, the color represented by Fig. 1*a* can be produced in a four color system by only two colors and black. This may be accomplished (Fig. 1*b*) by substituting black ink for all of the ink, the ink of minimum density (cyan in Fig. 1*b*) and reducing the other two colored inks by the amount of black used. This mode of four color reproduction is known as "full undercolor removal." Also, as taught in United States Patent No. 2,605,348 issued on March 10, 1948, in the name of Vincent C. Hall et al., it is often preferable to utilize an amount of black ink less than that used in full undercolor removal (Fig. 1*c*). In this "partial undercolor removal" the density of the lowest density ink (cyan in Fig. 1*c*), while considerably reduced, is not reduced to zero density value, and the density of the other two colored inks, while still reduced in measure with the amount of black ink used, are not reduced to the same extent as in full undercolor removal.

In Figure 2 there is shown in the form of a simplified block diagram a system for carrying out four color reproductions in the manner described above. This system is generally similar (except in the respects hereinafter mentioned) to the system disclosed in the aforementioned U.S. patent. In the system of Figure 2 a conventional electro-optical scanner 10 is adapted to scan successful elemental areas of an original visual subject (not shown), and to develop blue, green and red color signals which represent in amplitude the intensities of the correspondingly named additive primary color components inhering in the color of each of these areas. These blue, green and red color signals are fed from the scanner 10 to the respective inputs of three correspondingly named color channels. In Figure 2 the inputs to these color channels are represented by the leads 12, 12' and 12''. The nature of the scanner is such that the input color signals to the channels each take the form wherein the color information carried by the signal is represented by modulations on a high frequency carrier signal. In each instance a variation in amplitude of the modulations represents a variation in the same sense of the intensity of the primary additive color with which the color signal is associated. Within the blue, green, and red color channels the color signals are compressed, color masked, and otherwise considerably modified in ways which are unrelated to the present invention, and which, hence, are not described in detail herein. Following such modifications, the modulated high frequency color signals are supplied by one path of flow in their respective channels to the blue, green and red exponential modulators 13, 13' and 13''. By another path of flow in their respective channels, the blue, green and red color signals are first amplified by the amplifiers 14, 14', 14'', and are then respectively rectified by the rectifiers 15, 15' 15''. The three rectified color signals are then supplied in common to a maximum signal selector circuit 16, which, in a well known manner, provides an output signal corresponding in value to the largest in amplitude of the input rectified signals. This output signal will be referred to hereafter as the "initial black" signal in order to distinguish this signal from both that input signal to circuit 16 representing maximum additive color, and that signal passing through one of modulators 13, 13' 13'' which represents maximum additive color. For convenience, the last two signals are hereinafter referred to as the "predominant color signal" and as the "maximum color signal." It should be kept in mind that all three signals are of equivalent value.

The initial black signal is passed through an amplitude selective distortion circuit 17 which has a signal modifying effect (later described in detail). The output signal from the circuit 17 (hereinafter referred to as the "distorted black signal") is then supplied to each of the exponential modulators 13, 13', 13''. Each of these modulators thus has an input of a modulated high frequency color signal and an input of the distorted black signal. While the characteristics of these modulators will be later described in more detail, it suffices for the present to say that the modulators perform the function of masking the color signals by the distorted black signal in such manner that the colored inks and black ink laid down in the reproduction will have the relation shown in Figure 1*c*. In other words, the modulators, in terms of the inks laid down on the print, have the effect of reducing the amount of each colored ink laid down in proportion to the amount of black ink laid down. In the present instance it is contemplated, in accordance with Figure 1*c*, that the amount of black ink laid down, and the corresponding density reduction in the colored inks be not so great that the lowest density colored ink (i.e. cyan ink in Fig. 1*c*) is reduced to zero density value.

The three high frequency color signals after having been "black masked" in the modulators 13, 13', 13'' are rectified in their respective channels by the rectifiers 20, 20', 20'', and are then passed through the limiters 21, 21', 21'', and the D.C. amplifiers 22, 22', 22''. At the outputs of their respective channels, the blue, green and red color signals respectively excite the yellow magenta and cyan glow lamps 23, 23', 23'', to each emit a light of an intensity which varies with the amplitude of the current of the exciting signal.

The luminous emissions from the glow lamps are formed into reproducing light beams which scan in synchronism with the scanning action of the scanner 10. Sheets of photo-sensitive material are respectively exposed to these reproducing light beams so that three color separation negatives are provided by these sheets when developed. From these negatives are produced corresponding half-tone printer plates which are thereafter respectively inked with yellow, magenta and cyan ink.

To the end of providing a black printer plate, the distorted black signal from the ampiltude selective distortion circuit 17 is passed through a D.C. amplifier 32 to excite a black glow lamp 33. From this point on, the sequence of events in producing the black printer plate is substantially alike to that described for producing the color printer plates. The black printer plate is inked with black ink, and the final color reproduction is then obtained by transferring in super-position the three ink images on the three color half-tone printer plates and the black ink image on the black half-tone printer plate onto an ink receiving medium such as white paper.

The yellow, magenta and cyan ink colors are denoted "subtractive" primary colors herein by virtue of their association in this instance with printing inks which characteristically have a "subtractive" or light absorbing effect. The subtractive primary colors quantitatively bear a reciprocal relation to the additive primary colors. For example, yellow ink appears yellow by absorbing the blue component of impinging white light while reflecting the red and green components thereof, the last two components together being seen as the color yellow to the human eye. Hence, a large amount of blue in a color on the original is manifested as a low amount of yellow ink on the printed reproduction. Similar reciprocal relations exist between the amounts of green and red in the original and the respective amounts laid down of the magenta and cyan links. In practice, the reciprocal relations just described are obtained in the course of conversion of a negative into a half-tone plate. While the density of a given area on the negative varies in the same sense as the amplitude of the color signal which excites the glow lamp to expose the area, the amount of ink laid down in the corresponding area of the print varies in the opposite sense as the density of the negative in the given area.

It follows that the density on the print of any one of the four-mentioned inks bears a reciprocal relation to the amplitude of the signal which excites the glow lamp determining the deposition of that particular ink. In other words, a change in one sense of the amplitude of the exciting signal results in a change in the opposite sense of the density of the ink responsively laid down.

As taught in the aforementioned U.S. patent, a correct partial undercolor removal can be obtained by establishing certain glow lamp current relations set forth in expressions (10) and (12) in column 7 of the patent. To simplify the disclosure herein, it is assumed that the various glow lamp currents in the expressions of the patent can be considered equal in value to the voltages of the respective signals in the disclosed system from which the glow lamp currents are or would be derived. On the basis of this reasonable assumption (which for simplicity disregards constant factors of proportionality introduced in the system from linear signal gain or attenuation) the necessary relations for obtaining proper partial undercolor removal are:

$$V'_{color}=\frac{V_{color}\times V^{m}_{max.}}{V^{n}_{black}} \qquad (1)$$

$$V'_{black}=\frac{V_{max.}\times V^{n}_{black}}{V^{m}_{max.}} \qquad (2)$$

where the terms above have the following meanings:

$V'_{color}$—The voltage of any color signal at the output of the associated exponential modulator, the signal having been black masked therein.

$V_{color}$—The voltage of the input color signal to the modulator.

$V_{max.}$—The maximum voltage for an output color or black signal which is utilized to produce current for the glow lamps.

$V'_{black}$—The voltage computed as characteristic of an output black signal which develops proper black glow lamp current, if it is assumed that the black negative is given the same development as the other negatives.

$V_{black}$—The voltage value of the initial black signal.

*m* and *n*—Exponential terms which have a value less than 1.

According to the teachings of the aforementioned U.S. patent, the exponents *m* and *n* are equal to each other, and remain constant in value for all voltage values assumed by the initial black signal or the input color signals. In terms of the density of the ink laid down on the print, the exponents *m* and *n* represent that percentage by which the density of the lowest density ink is reduced from its three color density value. For example, if *m* and *n* have a value of 0.5, and cyan ink is the colored ink of lowest density, the density of the cyan ink will be lowered by 50% (Fig. 1*c*) from its three color value (Fig. 1*a*) in the course of the partial undercolor removal. It will thus be seen that if *m* and *n* have a value of 0.0, the reproduction obtained will be essentially a three color reproduction. On the other hand, if *m* and *n* have a value of 1, the reproduction obtained will be a four color reproduction with full undercolor removal. For values of *m* and *n* between these limits of 0.0 and 1, the reproduction will be the desired compromise between three color reproduction and four color reproduction with full undercolor removal.

As stated, according to the teaching of the aforementioned U.S. patent, both *m* and *n* are of equal value, and both of these exponents have a constant value in the sense that they do not vary as a function of the amplitude of the initial black signal or the color signals. In other words, the exponents *m* and *n* are maintained at the same value whether the color being scanned in a shadow tone (represented by a low amplitude of maximum color signal and, hence, of the initial black signal) or a medium or high light tone (respectively represented by medium and high amplitudes of the maximum color signal and, hence, of the initial black signal).

According to the invention it is contemplated that the exponent $m$ still be maintained at a constant value for all voltage variations of the initial black signal throughout its amplitude range. As a consequence the term $V_{max.}^{m}$ may be treated as a quantity which is at all times equal to a constant. However, according to the invention it is contemplated that exponent $n$ be rendered variable with the voltage of the initial black signal.

The information shown by Figures 3*a* and 3*b* derives from theoretical considerations concerned with obtaining the best reproduction in a four color reproduction system. These considerations indicate that to get the maximum ink deposition necessary to adequately reproduce shadow tones, a 75% ($n$ equals 0.75) black plate is required. Conforming theory with practice, however, it has been found that a 71% black plate is adequate for shadow tone, since it is presently possible to print more than the amount of ink necessitating a 75% black plate. However, if it is desirable for strength of color or other reasons to print a heavier black plate, it is within the scope of the invention to reproduce shadow tone by a black plate having a percentage value in excess of 71%.

The mentioned theoretical considerations also indicate that at neutral highlights, where the densities of all four inks must be brought to equality by some means or other, a 50% ($n$=0.5) black plate results by definition.

Accordingly, for best reproduction, it has been found desirable, in accordance with the invention, to have a variable black plate which gives a strong black in shadow areas but which reduces to 50% black in highlight areas.

In Figure 3*a* which shows the theory of such variable black plate, the horizontal ordinate in this figure represents volts on a logarithmic scale, and the vertical ordinate also represents volts on a logarithmic scale. For all of the graph lines of the figure the horizontal ordinate, represents either $V_{black}$, the volts of the initial black signal at the output of the signal selector circuit 16, or, $V_{color}$, the voltage of one of the color signals at the inputs of one of the modulators 13, 13′, 13″.

Graph lines A and B in Fig. 3*a* represent the respective conditions in the black channel and in the channel of the maximum color signal when full undercolor removal is desired. In other words, line A represents $V'_{black}$ (vertical ordinate) as a function of $V_{black}$ (horizontal ordinate), and line B represents $V'_{color}$ (vertical ordinate) as a function of $V_{color}$ (horizontal ordinate) wherein the exponents $m$ and $n$ in Expressions 1 and 2 each have a constant value of 1. From Expression 2 it is seen that line A represents a situation wherein $V'_{black}$ is linearly related to $V_{black}$ (but not necessarily equal to $V_{black}$ as apparently shown by 2, since expression 2 does not include linear gain or attenuation factors in the system). Considering line B, this line shows that where there is full undercolor removal, the maximum color signal is increased by masking with the black signal so that the masked maximum color signal has the limiting voltage value ($V_{max.}$) over the whole range of intensities of colors on the original subject. This result is to be expected in view of the fact that with full undercolor removal, the black-masked maximum color signal must in every case, cause a reduction of the lowest density colored ink to zero density value. This result is also verified by Expression 1, since when $m$ and $n$=1, the term $V_{max.}^{m}$ and $V_{black}^{n}$ become, simply $V_{max.}$ and $V_{black}$, respectively. As stated heretofore $V_{black}$ is equivalent in value to $V_{color}$ when the last term represents the maximum color. Accordingly, the upper term $V_{color}$ and the lower term $V_{black}$ reduce to the value "1" to leave $V'_{color}$ equal to $V_{max.}$ It will be noted that while line A represents the computed voltage ($V'_{black}$) for the output black signal as a function of the voltage ($V_{black}$) for the initial black signal, the line A also represents $V'_{color}$ (vertical ordinate) of the maximum color signal as a function of $V_{color}$ (vertical ordinate) of this signal when there is zero ($m$ and $n$=0.0) undercolor removal. This fact may be verified by making $m$ and $n$ of 0.0 value in Expression 1, in which case $V'_{color}=V_{color}$, the same identity of voltages as exists between the vertical ordinate and horizontal ordinate voltages of any point on graphline A.

As is evident from the facts that graph line A represents $V'_{color}$ as a function of $V_{color}$ when there is zero undercolor removal and that graph line B represents $V'_{color}$ as a function of $V_{color}$ for full undercolor removal, the degree of expansion given for full undercolor removal to the maximum color signal (by black masking in the associated exponential modulator) for any input value thereof is represented in Fig. 3*a* by the separation between the readings on the vertical scale for the respective points on lines A and B whose voltage values on the horizontal scale correspond with the input value of the maximum color signal. The other two color signals must each be also expanded in like manner such that the density of the two colored inks responsively laid down are reduced by the same amounts as the density of the lowest density ink is reduced.

Graph line C represents the relation in Expression 1 between $V'_{black}$ and $V_{black}$ when $m$ and $n$ are each of value 0.71 in Expression 1 to give 71% undercolor removal throughout the full intensity range of the colors on the original subject. In this instance, $V'_{black}$ is the value which is computed to be necessary if it is assumed that the black separation negative is given the same development as the color separation negatives. In fact this computed value of $V'_{black}$ can be considered as no more than an index of the density of black ink to be laid down. In practice, it is a matter of indifference whether the black ink density which accords with the computed value, $V'_{black}$, is obtained by giving a physical exponential expansion to the $V_{black}$ signal in accordance with Expression 1, or is obtained by using a black output signal which is linear with $V_{black}$ (line A), and by thereafter producing, photographically, an exponential effect through differential development of the black negative with respect to the color negatives. The latter practice is followed in the instant (Fig. 2) apparatus as a matter of convenience.

In graph line D the values thereof, taken on the horizontal scale, represent the $V_{color}$ value for the maximum color signal. The values of graph line D taken on the vertical scale represent, $V'_{color}$, the value for the maximum color signal after the same has been black masked in the associated exponential modulator with the black signal to provide 71% ($n$=0.71) undercolor removal. Also graph line D in its horizontal and vertical ordinate values can be considered to represent the $V_{color}$ and $V'_{color}$ values of any color signal when a neutral shade is being scanned so that all three color signals are equal.

Graph line D also indicates the degree of expansion which must be given in the associated exponential modulator to the maximum one of the color signals in order for this signal to provide for 71% undercolor removal. The degree of expansion necessary for any input value of the maximum color signal to a modulator is represented by the separation read on the vertical scale between the points on lines A and D which lie on the horizontal scale at this input value.

Note that for 71% undercolor removal the expansion of the maximum one of the color signals, as a color signal, is less than for the 100% undercolor removal case where the expansion for this color signal equals the separation read on the vertical scale between horizontally corresponding points on lines A and B.

The effect of the expansion indicated by line D on the maximum color signal is to reduce (from its three color density value) the density of the lowest density colored ink responsively laid down in an amount which is equal to the density of the black ink laid down, but which, instead of reducing the colored ink density to zero value, reduces it by a factor of 71% from its three color value. The other two color signals are each also expanded so that the density of the two colored inks respectively laid down will be reduced in amount the same as the lowest density ink is reduced.

Graph line E represents the situation in four color reproduction when $m$ and $n$ each have a value of 0.50 in each of Expressions 1 and 2 to provide 50% undercolor removal throughout the full intensity range of the original colors scanned. In this instance, line E represents on the vertical scale both $V'_{color}$ as a function of $V_{color}$ and $V'_{black}$ as a function of $V_{black}$. Otherwise line E may be interpreted in the same way as line D was interpreted above.

As stated, line D and line E (when the latter is considered to represent the maximum color signal rather than the black signal) are both graphical representations of the mathematical relations set forth by Expression 1. Line D represents these relations for the maximum color signal when $m$ and $n$ both have a fixed value of 0.71 in 1 to give 71% undercolor removal throughout the full range of color intensities. Line E represents these relations for the maximum color signal when $m$ and $n$ both have a value of 0.5 in 1 to give 50% undercolor removal throughout the full range of original color intensities. In accordance with theory, however, it has been pointed out that, for best results in reproduction, the percentage of undercolor removal should be lower in the highlights (high amplitude color signals) than in the shadows (low amplitude color signals).

An illustration of such variable percentage undercolor removal is given in Fig. 3*a* wherein a transition line F connects a low amplitude point on the 71% computed black line C with a higher amplitude point on the 50% computed black line E. If the black glow lamp current is made such that the density of black ink laid down is in accord with a computed black voltage signal ($V'_{black}$) which follows lines C, F and E in succession as the voltage of the initial black signal ($V_{black}$) increases in voltage from a low value to its upper limit, the density of black ink laid down will be proper to give 71% undercolor removal in the shadows and only 50% undercolor removal in the highlights.

If the computed black signal undergoes a transition from 71% undercolor removal in the shadows to 50% undercolor removal in the highlights, the three color signals must likewise undergo a transition in order that density of the colored inks will be in proper relation to the density of the black ink for each percentage value of undercolor removal. Line G, connecting the 71% and 50% color lines D and E, represents the color transition line which establishes this proper relation for the maximum one of the color signals, as a color signal, when the transition line F is used for the computed black voltage. Fig. 3*a* indicates that as the initial black ($V_{black}$) signal increases in amplitude from its lowermost to its uppermost value to cause the computed black to follow lines C, F and E, in succession, the maximum color signal should be acted upon so that output maximum color signal (from one of the modulators 13, 13', 13'') follows the lines D, G and E in succession.

A variable percentage undercolor removal of the sort described above is obtained in the presently described embodiment of the invention by virtue of the cooperative relation between the characteristic action of the amplitude selective distortion circuit 17 and the characteristic actions of the exponential modulators 13, 13', 13''. Considering first the modulators, these circuit elements (while not disclosed in the aforementioned Hall patent) may each be similar to the modulator disclosed in U.S. Patent No. 2,580,692, issued on January 1, 1952, in the name of William West Moe. The patented modulator is adapted to provide an output voltage in accordance with the expression:

$$E_3=\frac{E_1K}{E_2{}^p} \tag{3}$$

where $E_3$ is the modulator output voltage, $E_1$ is an alternating signal input to the modulator, K is a constant, $E_2$ is a direct current signal input to the modulator and $p$ is an exponent of a value less than 1 which remains constant despite changes in amplitude of $E_2$. In the present circumstances $E_3$ corresponds to $V'_{color}$, $E_1$ corresponds to $V_{color}$, and $V_{max.}{}^m$ corresponds to K, since both of these last-named terms are constants. Recasting Expression 3 in terms of the cross relations just given, there is obtained the expression:

$$V'_{color}=\frac{V_{color}\times V^m_{max.}}{E_2{}^p} \tag{4}$$

An inspection of Expression 4 indicates that, with the exception of the term $E_2{}^p$, this expression fully defines the partial undercolor removal relations set forth in Expression 1. If the modulator were adjusted to render $p$ equal to $n$ in Expression 1, and if $V_{black}$ (the initial black signal from circuit 16) were supplied as the $E_2$ input to the modulator, the modulating action would give the desired partial undercolor removal except for the shortcoming described below.

As stated, the term $p$ is an exponent which remains constant in value despite changes in the amplitude of $E_2$. In other words the modulators 13, 13', 13'' are of a type wherein the exponential modulating actions physically taking place therein are in accordance with an exponential function whereof the exponent is a constant. On the other hand, from the theoretical considerations discussed above, it is evident that the result desired is to provide a modulation of the color signals wherein the color signals will in effect be modulated as a function of $V_{black}$ raised to the exponent $n$ where $n$ varies as a function of the value of $V_{black}$. It is thus necessary to resolve the physical fact that $p$ is constant in the exponential modulating action with the theoretical requirement that in the term $V_{black}{}^n$, the exponent $n$ must be variable.

The resolution between physical fact and theoretical requirement may be accomplished, according to the present invention, by distorting the initial black signal (from circuit 16) with the amplitude selective distortion circuit 17, and by supplying the distorted black signal as the $E_2$ input to the modulators. The distortion effected on the initial black signal by the circuit 17 is of such nature that the actual modulation of the color signals by the distorted black signal, raised to the constant exponent $p$ in accordance with Expression 4, is equivalent in result to the modulation of the color signals which would occur if these signals were modulated by the initial black signal ($V_{black}$) with the initial black signal being raised to the exponent $n$ in accordance with Expression 1, and with the exponent $n$ varying in value as a function of $V_{black}$ in accordance with the theoretical considerations discussed above. In other words, the actual modulation of the color signals which takes place is in accordance with expression 1 when the exponent $n$ therein varies in value to give greater percentage undercolor removal in the shadows than in the highlights. The distortion imparted to the initial black signal by the circuit 17 is also of such nature that the computed black voltage ($V'_{black}$) derived from the distorted signal is in accordance with Expression 2 when the exponent $n$ therein varies in the same manner as in Expression 1.

Referring again to Fig. 3*a*, for a showing of how such distortion of the initial black signal is obtained, it is assumed in the present instance that the modulators 13, 13', 13'' are 50% modulators (i.e., $p$ for the modulators equals 0.5), in which case the amplitude selective circuit 17 takes the form of an exponential circuit which expands the initial black signal ($V_{black}$) so that, starting with a low voltage, as the voltage of the initial black signal increases (left to right movement on the horizontal scale), the circuit 17 output voltage (vertical scale) follows the line I rather than the line A up to a preselected voltage value H for the initial black signal. At H the expanding effect of circuit 17 ceases, and the output signal therefrom becomes a linear function of the initial black signal as represented by that portion of line A to the right of point H. The circuit 17 is thus an exponential expander which is amplitude selective in the sense that it provides an expansion effect in a selected amplitude range only. Since such expanders are well known in the art, the details of circuit 17 need not be described herein. A suitable type of expander may, however, be provided by modifying to give an expanding action to the system disclosed in the article "A Low Distortion Limiting Amplifier" appearing on pages 38–40 of the June 1939 issue of Electronics.

When the circuit 17 thus distorts the initial black signal so that with increasing voltage the black signal input to the modulators 13, 13′, 13″ follows the lines GA in succession rather than just the line A, the black signal input will act upon the 50% ($p=0.5$) color modulators in the voltage range for $V_{black}$ to the right of point H so that the color signals are expanded for 50% undercolor removal (as shown for the maximum color signal by the portion of line E to the right of point H). For values of $V_{black}$ to the left of point H, however, the distorted black signal will act on the 50% color modulators so that a transition is effected between 50% and 71% undercolor removal. This transition is shown for the maximum color signal by line G.

From Fig. 3*a*, it will be evident that if the color signals are modulated by the distorted black signal in the manner described, the density of black ink laid down must be in accordance with that indicated by a computed black voltage which with increasing voltage of $V_{black}$ follows lines C, F, E in succession. This mode of laying down black ink is desirable in order that, in the partial undercolor removal, the density of black ink laid down will be in proportion to the amount by which the densities of the colored inks are reduced by virtue of the expansion of the color signals as a function of the distorted black signal. It will be appreciated that the distorted black signal represented by lines GA is a signal which is adapted to provide a density of black ink in accordance with the computed black voltage CFE. In practice, a density of black ink which accords with a computed voltage CFE can be obtained, as stated, either by appropriately expanding the distorted black signal GA with an exponential expander (not shown herein) or by giving the black negative a differential development with respect to the color negatives.

It will also be appreciated that the circuit 17 need not be an exponential expander of the sort described, but may instead be an exponential compressor which compresses the initial black signal in the upper portion of its voltage range, but which ceases to compress the initial black signal when the voltage thereof drops below a preselected value as, say, the value represented by point H. For example, an exponential compressor of this sort might be utilized if the modulators 13, 13′, 13″ were 71% modulators, and if it were desired to provide a 71%–50% variable undercolor removal which in form would be equivalent to the undercolor removal obtained, as described, from 50% modulators. Amplitude selective exponential compressors of the sort described are well known in the art, and, hence, the details of circuit 17 as such an exponential compressor need not be discussed herein. The compressor, however, may be of the type disclosed in the aforementioned Electronics article.

The embodiment described above being exemplary only, it will be understood that the present invention comprehends other embodiments differing in form or in detail from the above-described embodiment. For example, the manner in which the shift in percentage of undercolor removal is obtained can be varied to provide the best reproduction in differing reproducing circumstances. Fig. 3*b*, for example, shows a set of graph lines which are generally analogous to these of Fig. 3*a*, but which represent a situation wherein the shift from 50% undercolor removal to 71% undercolor removal takes place at a voltage value which is much higher than the voltage value where the shift shown in Fig. 3*a* takes place. Accordingly, the invention is not to be considered as limited save as is consonant with the scope of the following claims.

I claim:

1. Apparatus for obtaining variable percentage undercolor removal in a facsimile color reproduction system wherein electro-optical means scans successive elemental areas of a colored original subject to transmit through respective electric channels a plurality of electric color signals respectively representing in amplitude the intensities of a plurality of additive primary color components of the colors of the scanned areas, and wherein a signal selector circuit is coupled to receive said color signals from respective sections of said channels and is adapted to separate from the received color signals that color signal which represents the additive primary color component of greatest intensity, said apparatus comprising a plurality of exponential modulators respectively coupled in said channels following said sections, each modulator being adapted to modulate the color signal in the associated channel in accordance with the relation $$E_3=\frac{KE_1}{E_2^p}$$

where $E_1$, $E_2$, $E_3$, K and *p*, respectively, represent the input color signal to the modulator, an additional input signal to the modulator, the output color signal from the modulator, a constant, and an exponent which has a value less than one and which remains constant in value despite variations in the amplitude of $E_2$, and a signal distortion circuit having an input connected to receive said separated signal from said selector circuit and an output connected to supply said separated signal in distorted form as the $E_2$ input to each of said modulators, said distortion circuit having a non-linear signal transfer characteristic whereby different values of the input/output ratio in amplitude are created for separated signals of different input amplitude passing through said distortion circuit.

2. Apparatus for obtaining variable percentage undercolor removal in a facsimile color reproduction system wherein electro-optical means scans successive elemental areas of a colored original subject to transmit through respective electric channels a plurality of electric color signals respectively representing in amplitude the intensities of a plurality of additive primary color components of the colors of the scanned areas, and wherein a signal selector circuit is coupled to receive said color signals from respective sections of said channels and is adapted to separate from the received color signals that color signal which represents the additive primary color component of greatest intensity, said apparatus comprising a plurality of exponential modulators respectively coupled in said channels following said sections, each modulator being adapted to modulate the color signal in the associated channel in accordance with the relation $$E_3=\frac{KE_1}{E_2^p}$$

where $E_1$, $E_2$, $E_3$, K and *p*, respectively, represent the input color signal to the modulator, an additional input signal to the modulator, the output color signal from the modulator, a constant, and an exponent which has a value less than one and which remains constant in value despite variations in the amplitude of $E_2$, and a signal distortion circuit having an input connected to receive said separated signal from said selector circuit and an output connected to supply said separated signal in distorted form as the $E_2$ input to each of said modulators, said distortion circuit being an amplitude selective circuit which distorts the separated signal in a limited amplitude range extending only part-way from one end of the whole range of input amplitudes of the separated signal, said distortion circuit accordingly providing different values of the input/output ratio in amplitude of the separated signal when the input amplitude thereof lies, respectively, in said limited amplitude range and in the remaining portion of said whole amplitude range.

3. Apparatus as in claim 2 in which said amplitude selective distortion circuit is an exponential expander which expands said separated signal in a limited amplitude range which extends upwards in amplitude from the low amplitude end of said whole amplitude range, said expander providing a linear input/output relation in amplitude for input amplitudes of said signal lying in the remaining portion of said whole amplitude range.

4. Apparatus as in claim 2 in which said amplitude selective distortion circuit is an exponential compressor.

5. Apparatus as in claim 4 in which said exponential compressor compresses said separated signal in a limited amplitude range which extends downwards in amplitude from the high amplitude end of said whole amplitude range, said compressor ceasing to compress said signal in the remaining portion of said whole amplitude range.

6. Apparatus for obtaining variable percentage undercolor removal in a facsimile color reproduction system wherein electro-optical means scans successive elemental areas of a colored original subject to transmit through respective electric channels a plurality of electric color signals respectively representing as amplitude modulations on a high frequency carrier, the intensities of a plurality of additive primary color components of the colors of the scanned areas, said apparatus comprising, a plurality of rectifiers each connected with a section of one said channels to provide a rectified color signal corresponding in amplitude with the modulation amplitude of the high frequency color signal transmitted through the section to further points in the channel, a signal selector circuit connected with each of said rectifiers to receive the respective rectified color signals therefrom and to separate from the plurality of received rectified color signals that rectified color signal which represents the additive primary color of greatest intensity, a plurality of exponential modulators respectively coupled in said channels following said sections, each modulator being adapted to modulate the high frequency color signal in the associated channel in accordance with the relation $$E_3=\frac{KE_1}{E_2{}^p}$$

where $E_1$, $E_2$, $E_3$, K and $p$, respectively, represent the input color signal to the modulator, an additional input signal to the modulator, the output color signal from the modulator, a constant, and an exponent which has a value less than one and which remains constant in value despite variations in the amplitude of $E_2$, and a signal distortion circuit having an input connected to receive said separated signal from said selector circuit and an output connected to supply said separated signal in distorted form as the $E_2$ input to each of said modulators, said distortion circuit being an amplitude selective circuit which distorts the separated signal in a limited amplitude range extending only part-way from one end of the whole range of input amplitudes of the separated signal, said distortion circuit accordingly providing different values of the input/output ratio in amplitude of the separated signal when the input amplitude thereof lies, respectively, in said limited amplitude range and in the remaining portion of said whole amplitude range.

7. Apparatus for obtaining variable percentage undercolor removal in a facsimile color reproduction system wherein electro-optical means scans successive elemental areas of a colored original subject to transmit through respective electric channels a plurality of electric color signals respectively representing in amplitude the intensities of a plurality of additive primary color components of the colors of the scanned areas, and wherein, a signal selector circuit is coupled to receive said color signals from respective sections of said channels and is adapted to separate from the received color signals that color signal which represents the additive primary color component of greatest intensity, said apparatus comprising a plurality of non-linear modulators respectively coupled in said channels following said sections and commonly coupled with said signal selector circuit to modulate the color signals in said channels as a function of said separated signal, and a signal distortion circuit having an input connected to receive said separated signal from said selector circuit and an output connected to supply said separated signal in distorted form to said modulators, said distortion circuit being an amplitude selective circuit which distorts the separated signal in a limited amplitude range extending only part way from one end of the whole range of input amplitudes of the separated signal, said distortion circuit accordingly providing different values of the input/output ratio in amplitude of the separated signal when the input amplitude thereof lies, respectively, in said limited amplitude range and the remaining portion of said whole amplitude range, the distortion characteristic of said distortion circuit and the modulation characteristic of said modulators being conjointly adapted to render the amplitude of said modulated color signals a function of said separated signal raised to an exponent which varies as a function of the amplitude of the separated signal.

8. Apparatus as in claim 7 in which said amplitude selective distortion circuit is an exponential expander which expands said separated signal in a limited amplitude range which extends upwards in amplitude range, said expander providing a linear input/output relation in amplitude for input amplitudes of said signal lying in the remaining portion of said whole amplitude range.

9. Apparatus as in claim 8 in which said amplitude selective distortion circuit is an exponential compressor.

10. Apparatus as in claim 9 in which said exponential compressor compresses said separated signal in a limited amplitude range which extends downwards in amplitude from the high amplitude end of said whole amplitude range, said compressor ceasing to compress said signal in the remaining portion of said whole amplitude range.

References Cited in the file of this patent

UNITED STATES PATENTS

| | | |
|---|---|---|
| 2,691,696 | Yule | Oct. 12, 1954 |
| 2,710,889 | Tobias | June 14, 1955 |
| 2,721,892 | Yule | Oct. 25, 1955 |
| 2,727,940 | Moe | Dec. 20, 1955 |